April 6, 1965 A. GALOPIN 3,177,470

CHARACTER SENSING SYSTEM

Filed Sept. 10, 1962 4 Sheets-Sheet 1

INVENTOR.
ANTHONY GALOPIN
BY
[signature]
ATTORNEYS

April 6, 1965 A. GALOPIN 3,177,470

CHARACTER SENSING SYSTEM

Filed Sept. 10, 1962 4 Sheets-Sheet 2

INVENTOR.
ANTHONY GALOPIN
BY
Weingarten, Orabuch & Pandiscio
ATTORNEYS

INVENTOR
ANTHONY GALOPIN
BY
Weingarten, Orenbuch & Pandiscio
ATTORNEYS

INVENTOR.
ANTHONY GALOPIN
BY
Weingarten, Orenbuch & Pandiscio
ATTORNEYS

United States Patent Office 3,177,470 Patented Apr. 6, 1965

3,177,470

CHARACTER SENSING SYSTEM

Anthony Galopin, Reading, Mass.
(2023 Kalorama Road, Washington, D.C.)

Filed Sept. 10, 1962, Ser. No. 222,284
23 Claims. (Cl. 340—146.3)

This invention relates to the field of character recognition and more particularly to an improvement in character sensing systems.

The primary object of the present invention is to provide a character sensing system which is less cumbersome but has better resolution capability than systems currently available.

A more specific object of the present invention is to provide a character sensing system which was novel means for positively identifying both alpha and numeric characters and also other characters and symbols, the various characters being identifiable by mutually exclusive patterns of significant character increments.

Still another object of the present invention is to provide an optical character sensor comprising a planar sense plate onto which characters are directed or superimposed either directly or via a lens system, the sensor being adapted to sense individual characters by the presence or absence of light at specific points on the sense plate.

A further object of the present invention is to provide an optical character sensing system which is adapted to identify either the positive or negative images of individual characters. For the purposes of this invention, a positive image exists when the character is darker than its background and a negative image exists when the character is lighter than its background.

The invention is based upon the use of glass fiber optical rods (sometimes called "light pipes") which are adapted to transmit light from one end to the other without any significant loss of intensity, distortion, or cross-talk with neighboring rods even though they are bent at one or more places. The optical characteristics of glass fiber rods are well known, having a refractive index at their surface which is smaller than the refractive index of their interior. They have a particular advantage in that they can be made quite small in diameter, e.g., .011 inch. The present invention involves provision of a character sense plate wherein the ends of a plurality of glass fiber rods are secured in coplanar relation with each other. The ends of the rods form a matrix of sensors, each adapted to recognize the presence or absence of a character increment at a particular designated spot related to the sense plate. Preferably, the ends of the rods are embedded in a compatible supporting medium. The embedding medium may be glass or plastic, and its light transmitting characteristics may vary. Preferably, however, it is opaque so as to minimize light dispersion losses and cross-talk in transmission of the character image to the individual sensors. At their other ends, the fiber rods are arranged to provide a sensing system which can accurately detect every character to be identified. The rods sense and transmit character image increments which can take the form of a maximum or minimum of light, depending upon how the characters are directed or superimposed onto the sense plate. By way of example, if the characters are printed in dark ink on white paper and the paper is positioned directly over the sense plate, sensor rods thereof will be blocked off from light by the dark printing of the characters, in which case, the character image increments transmitted by the rods take the form of minimum light. Within the scope of the present invention are two types of character examination—(1) examination of all portions of a character at one time and (2) examination of different portions of a character at successive times. The former type of examination is the basis of a preferred embodiment of the invention hereinafter described. In this preferred form of the invention, the fiber rods are arranged in discrete groups, one for each character to be identified, each group of rods forming a discrete pattern in the matrix with each rod comprising a signifcant increment of the character pattern. Each group of rods is connected to a character detector which produces an output signal when the fiber rods connected thereto all have transmitted character image increments within a predetermined time interval. Also described and illustrated are alternative embodiments wherein different portions of a character are examined at different times. In one alternative embodiment, each character is moved over a sense plate and the presence or absence of a particular character is determined by the presence or absence of character image increments at different intervals of time. In the other alternative embodiment, each character is located on a sense plate and different portions thereof are scanned without moving the character.

Other objects and many of the attendant advantages of the invention will be readily appreciated as the invention becomes better understood by reference to the following detailed description when considered in connection with the accompany drawings wherein.

Figures 1, 2:
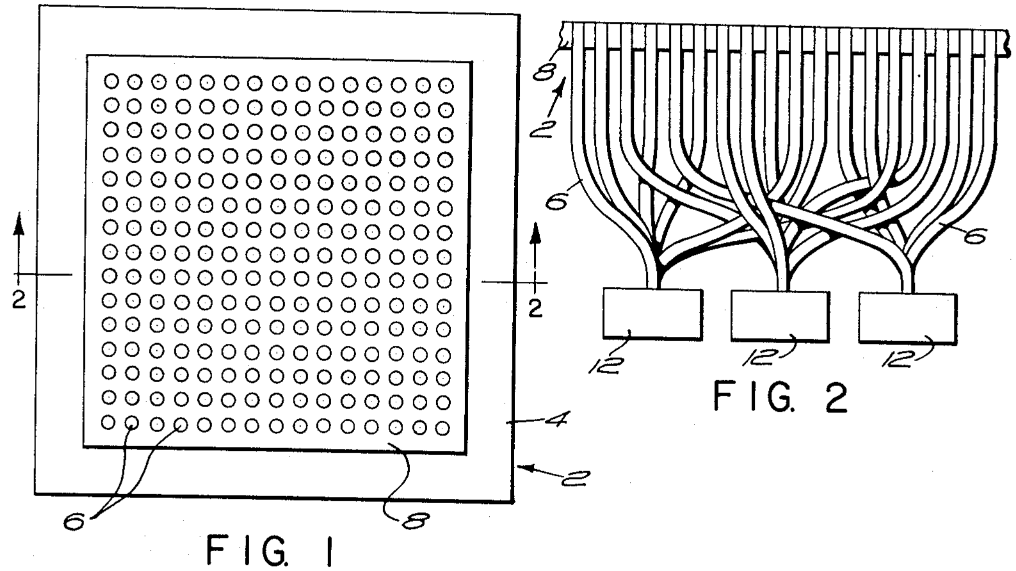
FIG. 1 is a plan view of a character sense plate constructed according to a preferred form of the present invention.
FIG. 2 is an enlarged fragmentary sectional view taken along line 2—2 of FIG. 1 showing how the glass rods are grouped for different characters.

Referring now to FIG. 1, there is shown a character sense plate 2 comprising a frame 4 surrounding a matrix consisting of the ends of a plurailty of flexible optical glass fiber rods 6 arranged in even rows and embedded in a plastic binder 8. The glass rods are of relatively small diameter, their size and number being variable and determined to a considerable extent by the number and size of the characters to be recognized. Preferably, the rods will have a diameter in the order of 1 to 10 mils. (.001–.010 inch). Since the rods are relatively small in size, the number of rods embodied in a single sense plate may be quite large. Therefore, it is to be understood that the number of rods illustrated in FIG. 1 is illustrative only and that in practice several times the number shown may be included in a sense plate whose matrix measures no more than .01 inch on a side. Each individual rod may comprise a single fiber or a plurality of fibers fused together. In the latter case, the fibers in each rod may be arranged so as to transmit an undistorted image or a distorted, i.e., scrambled, image. The important thing is that each rod transmit light without any significant loss of intensity and without cross-talk. The composition of the binder is not critical—its primary requirements are that it be strong enough to make a fairly rigid matrix and that it be stable dimensionally. Epoxy and polyester resins are among the plastics which may be used. Preferably, the binder should be opaque to minimize light dispersion losses and cross-talk when a character image is directed onto the sense plate. However, the binder also may be translucent.

Only one end of each glass rod is embedded in the sense plate. The remainder of each rod extends free of the sense plate, and these free ends are collected into separate sensing groups as shown in FIG. 2, with one group for each character to be recognized by the system. Each bundle is made up of rods which are located in selected areas of the sense plate and together define a unique pattern representative of a particular character. No two groups comprise the same glass rods so that the various patterns formed by the different groups are mutually exclusive. This is shown in FIGS. 3 and 4.

Figure 3:
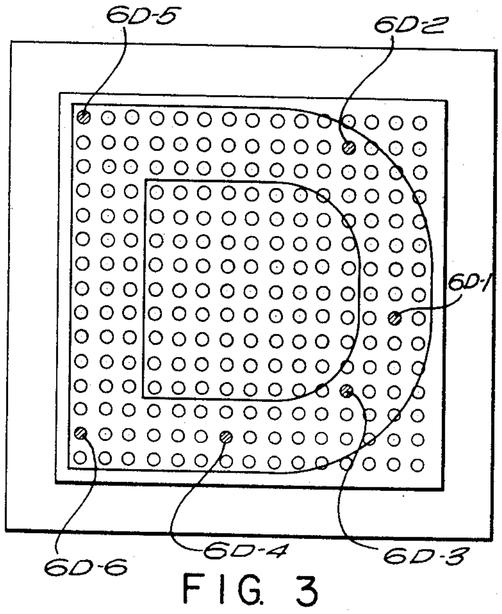
FIG. 3 is a view similar to FIG. 1 but with the image of the character "D" superimposed on the plate.
Figure 4:
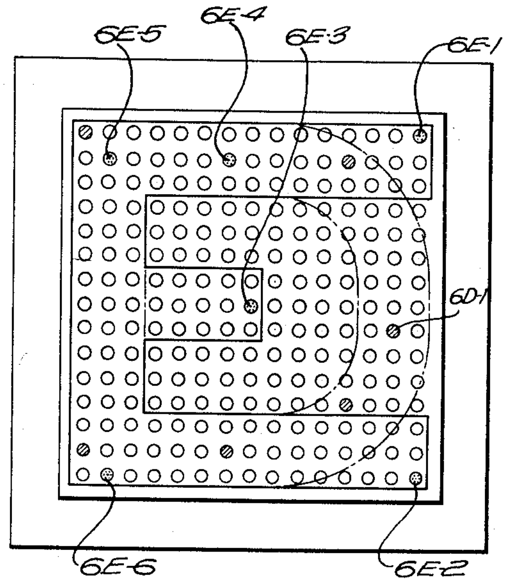
FIG. 4 is a view similar to FIG. 3 but with the image of the character "E" superimposed on the plate.

In FIG. 3, the image of the letter "D" is shown projected onto the sense plate. The two branches of the character image overlie a plurality of glass rods. If it is assumed that each time a character is disposed for examination it will occupy substantially the same position on the sense plate (and this is essential for the embodiment now being described), certain glass rods may be reserved for the letter "D." These rods reserved for "D" are among the ones upon which the "D" image is superimposed and are identified in FIG. 3 by cross-hatching and the common designation 6D. Although six glass rods are shown reserved, it is to be understood that the sense plate can be designed so that more or less rods may be used to establish an identification pattern for "D". In FIG. 4, the letter "E" is projected onto the sense plate, and for the purpose of comparison, the letter "D" is shown in phantom. It is to be observed that the letter "E" image overlies some of the same glass rods as does the letter "D" image. Three of these same glass rods, as well as three other rods not covered by the "D" image, are reserved for the letter "E." These six "E" rods have the common designation 6E and are shown stipled to distinguish them from the ones reserved for "D." Although not shown, it is to be understood that the remaining glass rods are reserved in the same way for other alpha and numeric characters.

Figure 5:
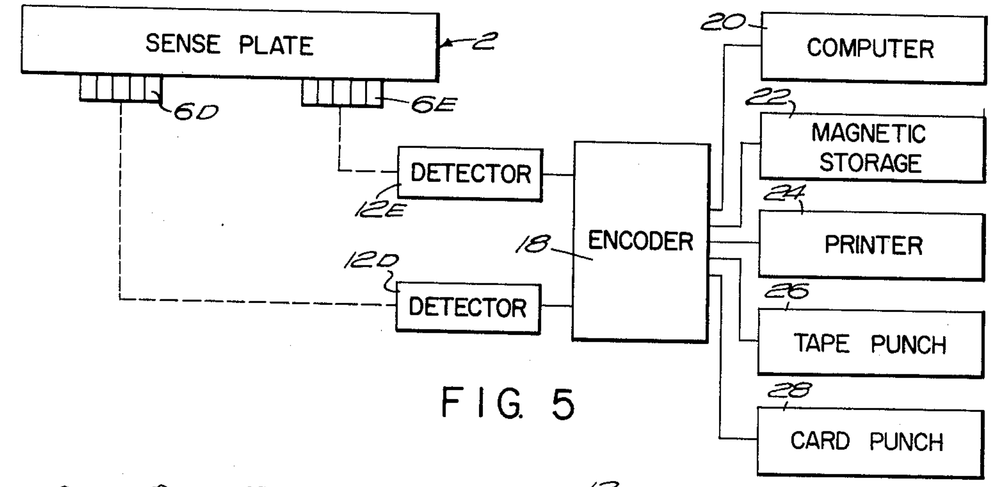
FIG. 5 is a block diagram of a system embodying the sense plate of FIG. 1.

As illustrated in FIG. 2, each group of glass rods is connected to a different character detector 12. Referring now to FIG. 5, for convenience only two detectors 12D and 12E are represented. The group of rods 6D and 6E reserved for the letters "D" and "E" are connected to detectors 12D and 12E respectively. Each detector is adapted to produce an output signal each time it detects a specific character. The output signals of the various detectors are applied to an encoder 18 having a separate input terminal for each detector. The encoder is adapted to translate each particular input signal into a different binary coded output signal representative of a single character. The encoder output may then be utilized to initiate various operations, as, for example, to operate a computer 20, to record each character in a magnetic storage device 22, or to operate a printer 24, a tape punch 26, and/or a card punch 28. Details of construction of the encoder and the various devices which may be operated by the encoder output are omitted since such equipment is well known to persons skilled in the art and readily available on the open market. Moreover, these equipments may take various forms without departing from the principles of the present invention. It is to be observed also that a separate encoder is not mandatory and that other arrangements are possible which will yield the same results.

Figure 7:
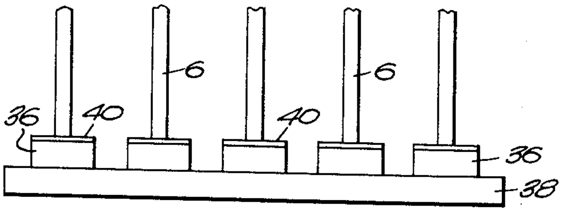
FIG. 7 illustrates how the glass fiber rods are coupled to the photocell unit of the detector of FIG. 6.
Figure 6:
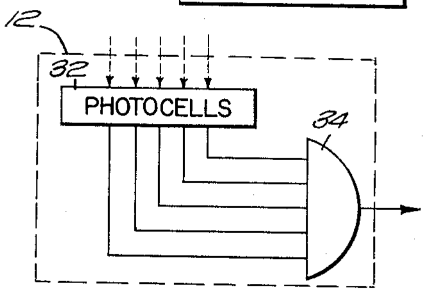
FIG. 6 illustrates a form of detector employed in the preferred embodiment of the invention.

The individual character detectors are all substantially alike and may take various forms. FIGS. 6 and 7 show one form of detector which may be used. The illustrated detector comprises a photocell unit 32 and an AND gate 34. The photocell unit consists of a battery of photocells 36, one for each glass rod 6 in the selected group to which it is to be connected. The battery of photocells is mounted on a suitable rigid support plate 38, and each photocell has a photosensitive surface 40. Each glass rod is disposed with its end face engaging or nearly engaging the photosensitive surface 40 of the photocell to which it is attached, whereby any light transmitted by the rod will impinge directly on the photosensitive surface. The AND gate 34 has a separate input for each photocell and is of the type adapted to produce an output only when the signals at all of its inputs fall below a predetermined level within a given time period, preferably simultaneously. In the illustrated embodiment, the photocells are of the type whose output increases and decreases in magnitude with corresponding changes in the magnitude of the light applied thereto by the glass rods.

A system of the character hereinabove described will operate according to the following description. Assume that a light of constant intensity is directed onto the sense plate so that each glass rod transmits a given quantum of light to the photocell to which it is connected. The light detected by the photocells will cause them to produce outputs having a predetermined minimum amplitude sufficient to prevent the several AND circuits from generating output signals. If thereafter a positive, i.e., dark, character image is superimposed on the sense plate in a prearranged examining position, certain of the optical rods will experience a sharp reduction in incident light due to the shading effect of the character image. Thus, for example, if the character is the letter "D," the rods which experience the sharp loss of light will be the ones underlying the superimposed image. The other glass rods also may experience a reduction in incident light if the character is printed on a sheet of paper which is not transparent, as, for example, letterhead paper. However, the light loss experienced by these remaining rods will be but a fraction of the light loss resulting from interference by the printed character, and the AND gate can be made not to respond to such minor light losses. The sharp loss in light at predetermined points on the sense plate caused by the printed character "D" is transmitted by the light rods 6D to the photocells of detector 12D. Simultaneously, all of the photocells in that detector will produce negative output signals, fulfilling the condition on which the AND gate of the detector will produce an output signal indicative of the presence of a "D." The same thing will occur each time a "D" is superimposed on the sense plate in the same predetermined examining position. On the other hand, if an "E" is positioned for examination, its presence will not cause detector 12D to operate since it will interfere with the light reception of some but not all of the light rods connected to that detector. To be specific, the "E" image will not cause a sharp change in the light received by the light rod 6D–1 (FIG. 4). However, detector 12E will be actuated since all of the light rods 6E connected to its photocells will be in line with and, therefore, blocked off by the E image.

Figures 8, 9:
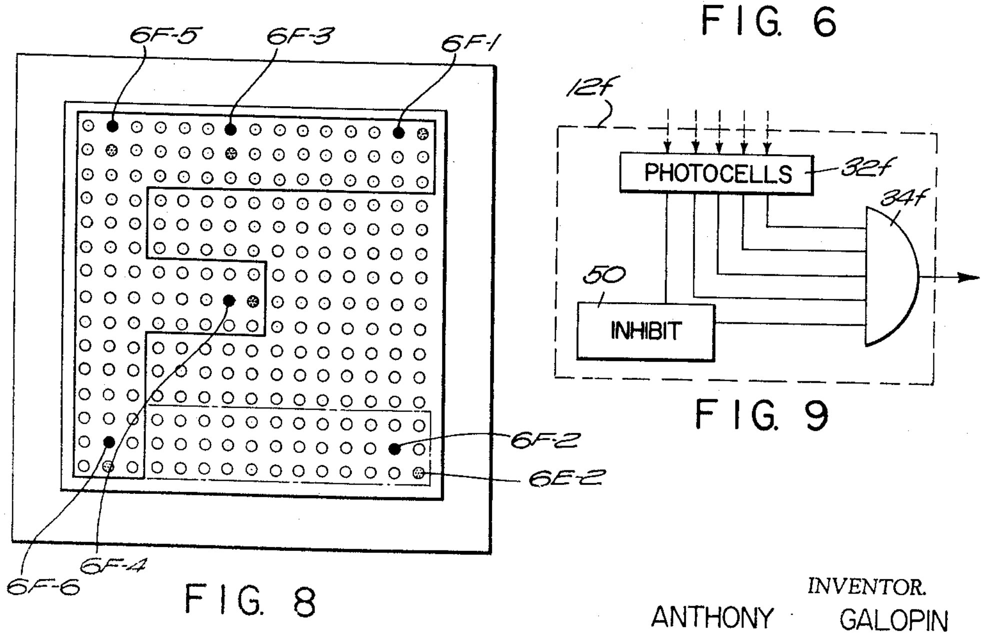
FIG. 8 is a view similar to FIG. 4 but with the image of the character "F" superimposed on the sense plate.
FIG. 9 illustrates a modified form of the detector of FIG. 6.

Since the gate in each detector will not operate unless all of its inputs simultaneously experience substantially the same input signal, the system is able to distinguish readily any character whose image does not simultaneously affect the light reception of all the rods in two or more different character groups. However, with a system to the extent described hereinabove, it is impossible to positively distinguish each character from every other character to be recognized unless the character forms are such that no one complete character form duplicates or lies wholly within the confines or any part of any other character to be recognized. In other words, special character forms would have to be restorted to which would have mutually exclusive images. Thus, an "F" would have to be shaped so that when it is superimposed upon an "E," not only would the "E" have a portion which is unmatched by a corresponding portion of the "F," but the "F" would itself have a portion which is not matched by a corresponding portion of the "E." However, while the present invention is capable of recognizing special character forms which are mutually exclusive it is not restricted to such characters but is adapted by means hereinafter described to recognize substantially any kind of character provided that as between any two characters the image or pattern of one superimposed on the sense plate overlies at least one rod which is not covered by the image or pattern of the other. Thus, as between the letters "D" and "E" for example, this condition is met two ways. In FIG. 4, the "D" pattern overlies rod 6D–1 which is not included within the "E" pattern, while the latter overlies rods 6E–1, 6E–2, and 6E–3 which are not covered by the "D" pattern. This condition also is met in FIG. 8 which shows that the "E" image covers a rod 6E–2 which is not covered by the "F" pattern. However, the "F" image does not cover rods which are not covered by the "E" image. Therefore, unlike the situation of FIG. 4 where the patterns are mutually exclusive, projection of an "E" image on the sense plate will produce a drop in light intensity not only all of the "E" rods but also for all of the rods normally affected by an "F" image. Thus, if the photocells for selected rods normally affected by an "F" image were all connected directly to an AND gate in the same manner as the photocells in detectors 12D and 12E, an "E" image would not only produce an "E" output signal but also an "F" output signal. However, such an error due to the one-way exclusivity of the two character patterns is avoided by arbitrarily including in the group of rods set aside for recognition of the character "F" at least one rod which is blocked off by an "E" but not by an "F." This is illustrated in FIG. 8 where the rods 6F selected for connection to an "F" detector are shown fully colored to distinguish them from the "E" rods which are stipled. Five of the "F" rods (6F–1 and 6F–3 to 6F–6) fall within the interference pattern of both "E" and "F," but the sixth rod 6F–2 falls only within the interference pattern established by the character "E." As shown in FIG. 9, the "F" rods are coupled to individual photocells in a photocell unit **32*f* of an "F" detector 12F which also includes an AND gate 34*f*. As in the detectors 12D and 12E, the outputs of the photocells are coupled to the AND gate. However, where the photocells for the rods 6F–1 and 6F–3 to 6F–6 are directly coupled to the AND gate, the photocell for the rod 6F–2 is indirectly coupled via an "inhibit" circuit 50. The latter is designed to apply a negative signal to the gate until such time as its photocell experiences a sharp reduction in the light transmitted by rod 6F–2, at which time it will generate a positive signal to the gate. Hence, if an "F" image is projected onto the sense plate so that rods 6F–1 and 6F–3 to 6F–6, but not rod 6F–2, are subjected to light reduction, gate 34*f* will produce an output since the inputs from the five photocells coupled to rods 6F–1 and 6F–3 to 6F–6 will go negative while the input from inhibit circuit 50 will remain negative. However, when an "E" image is projected, gate 34*f* will not produce an output since, although the inputs from the photocells for rods 6F–1 and 6F–3 to 6F–6** will all go negative simultaneously the input from the inhibit circuit will go positive.

In the preferred embodiment just described, the different groups of rods established for the various characters involve the same number of rods. This permits use of identical photocell assemblies and gate circuits with a consequent cost advantage. It also equalizes the system's resolution capabilities for the various characters. However, it is contemplated that the same number of rods need not be set aside for each character since some characters such as K, X, and Z may be easily recognized using only a few rods whereas other characters such as B, E, F, and L may require additional rods in order to be more clearly distinguishable one from the other.

Although not shown, it is contemplated also that some of the glass rods could be used for recognition of more than one character, in which case each such rod would have to be coupled so as to produce an input to more than one AND gate. This may be accomplished by connecting the output of the photocell to which each such rod is attached to more than one AND gate. However, the photocells of at least some of the other rods whose light reception is altered by the same two or more characters must be connected to only one AND gate in order for the system to be able to distinguish between the two or more characters. In other words, each AND gate must be responsive to mutually exclusive groups of input signals.

Figure 10:
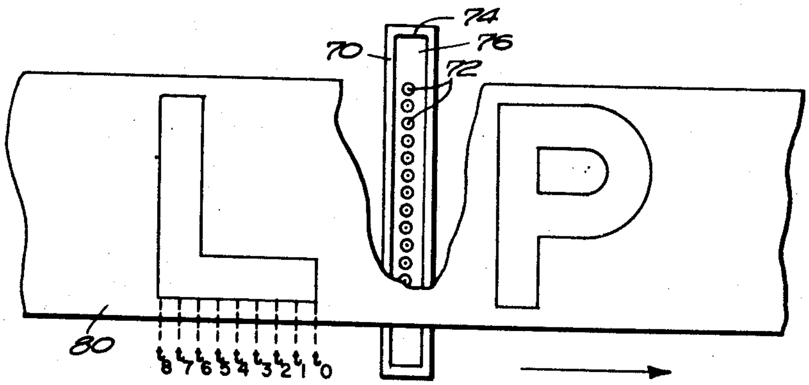
FIG. 10 is a fragmentary plan view of a first alternate form of the invention.
Figures 11, 12:
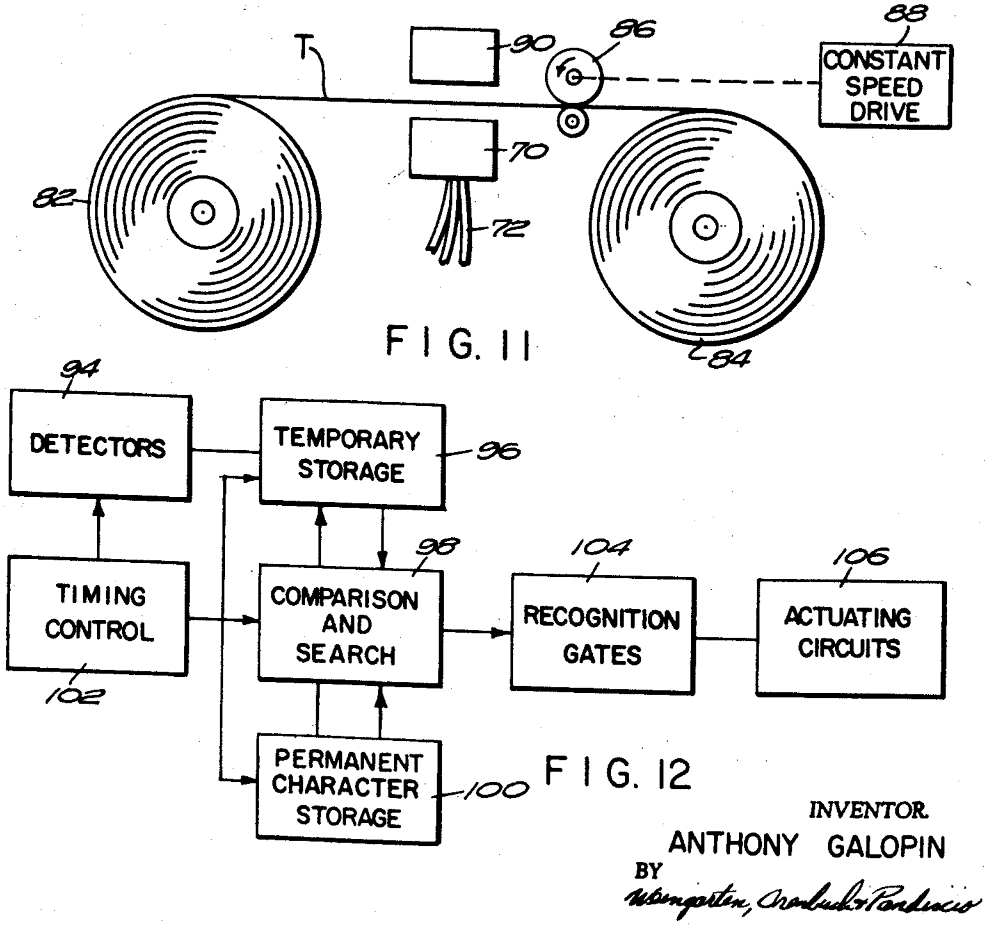
FIG. 11 is based on FIG. 10 and is a schematic elevational view showing how characters are moved across the sense plate.
FIG. 12 is a block diagram of a system embodying the concepts shown in FIGS. 10 and 11.

A first alternate form of the present invention is illustrated in FIGS. 10, 11, and 12. The embodiment shown in these figures embodies a line sensing scheme which permits a sampling of an observed character during a specific time. The illustrated system includes a character sense block identified generally at 70 which includes a plurality of glass fiber rods 72 whose ends are embedded in a suitable medium 74 which provides a flat surface 76 onto which the characters may be superimposed or projected. The fiber rods 72 are arranged in a straight row. The form of the invention requires means for moving a character image over the sense block so that different portions may be sampled at predetermined intervals. The means for moving the image of a character across the sampling block can take various forms without departing from the principles of the present invention. Thus, the character may be projected onto surface 76 by a lens system adapted to cause the image to move across the block at a specified speed. Alternatively, and as shown in FIGS. 10 and 11, the characters may be printed on a paper tape T which is unwound from a supply roll 82, transported over the sensing block 70, and rewound on a takeup roll 84 at a predetermined linear speed established by a capstan 86 driven by a constant speed drive 88. This type of drive system is well known in the magnetic tape recorder art. A constant intensity light source 90 may be positioned above the strip T to illuminate it and thereby cause relatively large changes in the intensity of light received by rods 72 as the characters pass over the sensing block.

Referring now to FIG. 12, the first alternate form of the invention includes a plurality of light detectors 94, a temporary storage unit 96, a comparison and search unit 98, a character storage memory unit 100, a timing control 102, and a battery of recognition gates 104, with the outputs of the latter employed to control selected actuating circuits 106, such as the units 20–28 shown in FIG. 5. Each of the detectors is similar to the one shown in FIG. 6 except that it has only one photocell to which is coupled a single rod 72 and its AND gate has only two inputs, one for the single photocell and one for the timing control unit which applies negative pulses at a predetermined repetition rate. The memory unit 100 provides a permanent log of time-based character recognition codes for all of the characters desired to be recognized. Sampling is conducted in response to the output of the timing control unit which also synchronizes the temporary and permanent character storage outputs to the comparators.

As each character is moved across the sensing block, it is examined and read by the fiber rods 72 which transmit to the individual detectors an indication of the presence or absence of a character increment at a predetermined sampling time. Preferably, the detector units produce an output each time the rods connected thereto experience a sharp reduction in incident light intensity in time coincidence with a timing pulse from timing control unit 102. By means of the comparators, the sensed output from the detectors is compared with permanently stored character symbols within the memory unit 100. A time sequence of several sampling periods, e.g., 8, is employed for each character. As successive portions of a letter such as the "L" shown in FIG. 10 travel over the sensing block, the detectors 94 sample the light outputs of the rods 72 once during each of the periods $t_0$–$t_1$, $t_1$–$t_2$ . . . $t_7$–$t_8$ and transmit to the temporary storage unit 96 outputs indicative of the aforesaid light outputs. The information about a character supplied to the temporary storage unit 96 is retained just long enough to be compared with the time-based codes for each and every character stored in the permanent storage unit 100. By the process of elimination, i.e., after the series of comparisons for all permanently stored characters, the sampled character is identified since no two characters will provide corresponding outputs from the same detectors in the same order during a given sampling period. The comparison and search unit 98 produces an output representative of a given permanently stored character whose code is matched by the detector outputs of a sampled character. The output of the comparison and search unit 98 is applied to the recognition gates, each of which is adapted to respond to the code of a different permanently stored character. Hence, the identification of the sampled character is completed by the recognition gates.

A particular advantage of the first alternate form of the invention is that it permits continuous operation since the text is undergoing movement all the while that the sampling, comparing, and recognizing steps are being executed. This is made possible because the temporary storage unit, the comparison and search unit, and the recognition gates operate at very high speeds, thereby permitting a series of logic operations in the time that a single character is being sampled by the sense block 70. Moreover, it requires fewer glass rods with still fewer connections to individual detectors. However, it involves more complicated electronic components, albeit the memory units, comparison and search units, recognition gates, and timing control unit are conventional and, even if not all readily purchasable, their constructions are well within the skill of the art. Furthermore, the characters must move at a constant speed so that sampling may be properly related to the time-based codes recorded in the permanent character storage unit 100.

Figures 13, 14:
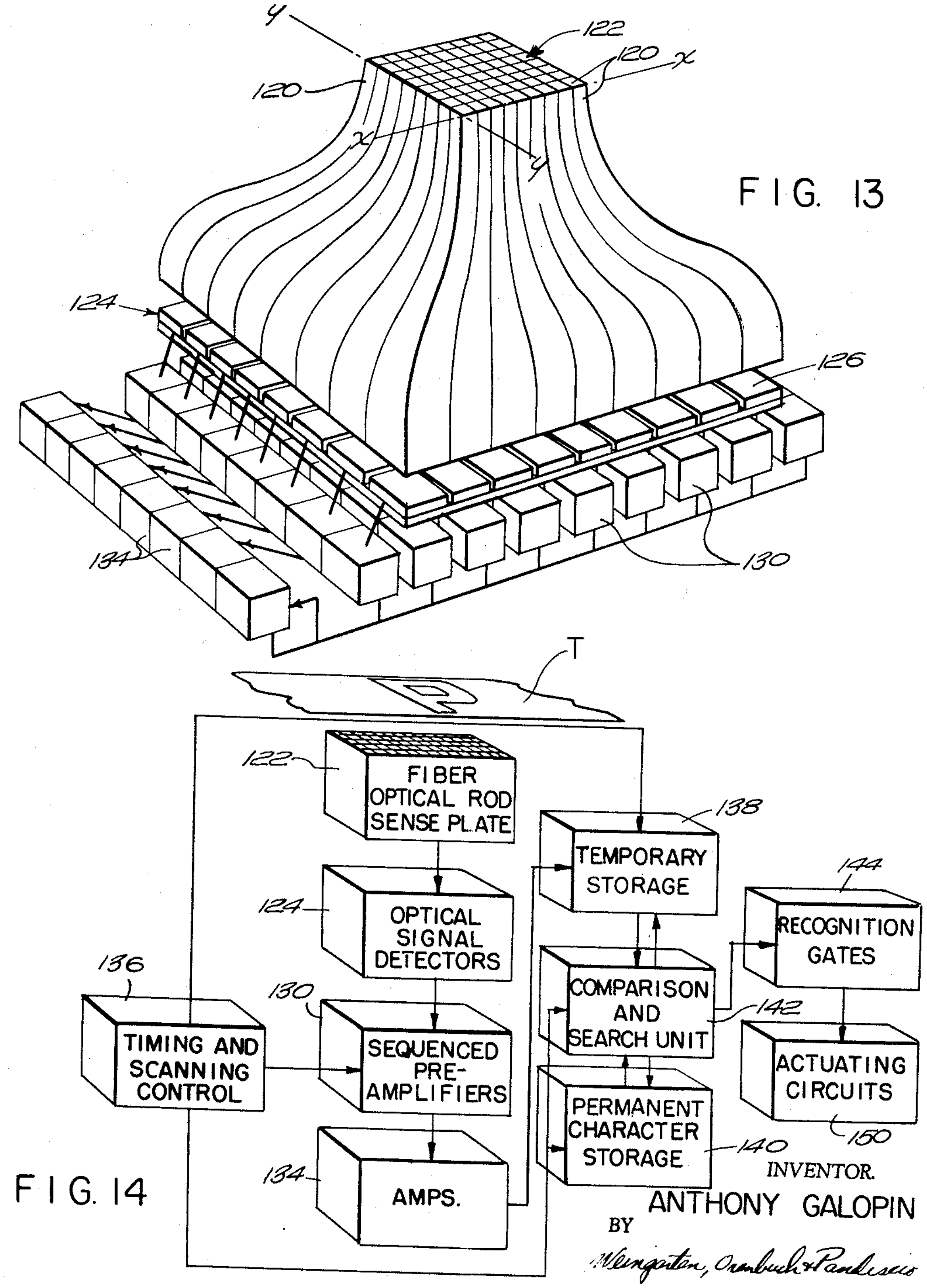
FIG. 13 is a schematic perspective view of certain components of a second alternate form of the invention.
FIG. 14 is a block diagram of a system embodying the concepts shown in FIG. 13.

Another alternate form of the invention is illustrated in FIGS. 13 and 14. This additional form utilizes a matrix arrangement of optical fiber rods similar to that embodied in the sense plate of FIG. 1 but far less rods are required to attain the same resolution capability. In the illustrated embodiment of this alternate form of the invention a group of optical rods 120 are arranged in a horizontal series of vertical rows so as to form at one end a square sense plate 122. As used herein, the terms "horizontal" and "vertical" mean along the X and Y axes shown in FIG. 13. Preferably, but not necessarily, the rods are made tapered so that they have a relatively small size at their sense plate ends and a relatively large size at their opposite ends. At their larger ends, the rods may be separated one from the other as in the sense plate shown in FIG. 2, or they may be bonded together so as to yield an integral unit having a form generally similar to a truncated pyramid as shown in FIG. 13.

Disposed adjacent to the larger ends of rods 120 is an optical signal detector matrix 124 made up of like photocells 126. Preferably, the rods 120 are attached directly to the photosensitive surfaces of the photocells in the manner described previously in connection with FIG. 7. Operatively associated with the matrix of photocells is a plurality of like preamplifiers 130, one for each photocell. The preamplifiers are arranged in groups, each group reserved for a different row of photocells. Operatively associated with the matrix of preamplifiers is a battery of amplifiers 134 equal in number to the number of preamplifiers in each row thereof. Operation of the preamplifiers is controlled by a timing and scanning control unit 136 which activates each row of preamplifiers in sequence at a predetermined rate to effect sampling of the character image increments sensed by the rods and detected by the photocells in the corresponding rows of the sense plate 122 and the detector matrix 124.

The amplifiers 134 amplify the sequential outputs of the different rows of preamplifiers and apply them as inputs to a temporary storage unit 138. Also included in the system of FIGS. 13 and 14 is a permanent character storage unit 140, a comparison and search unit 142, and a plurality of recognition gates 144. Together with the timing and scanning control 136, these circuits form a character recognition system similar to the one described previously in connection with FIG. 12. Final recognition of the character displayed on the sense plate 122 is effected by the gates 144 whose outputs are used to control actuating circuits in various equipments such as automatic printers, punchers, and the like. In principle, the system of FIGS. 13 and 14 is similar to the system of FIGS. 10–12 except that in the latter scanning is accomplished by movement of the character while in the former scanning is accomplished by strobing successive rows of sensors. In the system of FIGS. 13 and 14, it is preferred that the characters remain stationary on the sense plate for a short period of time. Thus, if the character to be read is printed on a tape T, the drive mechanism therefor would be adapted to move it intermittently, each stop having a time duration sufficient to strobe successive rows of sensor. However, it is to be appreciated also that the character need not be stopped but may move across the sense plate at a constant rate of speed. This speed should be sufficiently slow so that in the time required to completely scan the sense plate the outputs of individual photocells will remain the same.

While the system of FIGS. 13 and 14 is less direct than the system of FIGS. 1–9, it nevertheless offers certain advantages. For one thing, ambiguity of character recognition is minimized because the character registration need not be precise. Furthermore, the tolerances for alignment and definition are not so demanding. In addition, the total number of sense rods required in the sense plate is much less because they are not segregated into distinct character groupings.

It is to be observed that the several forms of the invention illustrated and described herein permit the use of sensing means which act on a minimum or maximum of light, depending upon the lighting arrangement and disposition of characters. Thus, the characters may be projected onto the sense plate directly without magnification or through a lens system with magnification. As used herein, the term "projected" is intended to cover projection of a character image by a lens system with or without magnification and also superimposition of a character form or a sheet of material bearing a character directly upon the sense surface.

It is also intended that the invention herein illustrated and described may be used for various purposes without departing from the principles thereof. For this reason, the term "character" as used herein is intended to embrace and denote alpha and numeric characters as well as other types of symbols and designations for ideas and things. It is also understood that the systems may be modified to incorporate various additional or substitute circuits and components.

Obviously, many other modifications and variations of the present invention are possible in the light of the foregoing teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:

1. A character sensing system comprising a planar character sense plate for receiving character images, said sense plate comprising a plurality of optical fiber rods and means supporting said rods at one end in spaced relation to each other so as to form a detection matrix of light sensors, and with said rods having other ends directly coupled to photosensitive detectors, such that they are attached to said detectors, the combination designed to permit a direct electronic recognition and detection of a variety of character patterns.

2. The combination of claim 1 which contains a group of optical light rods arranged to provide a sense matrix reference along only one axis, to permit a scanning in a direction perpendicular to the oriented group of optical fiber rods.

3. The system described in claim 1 in which a plurality of light responsive detectors is employed, having means segregating said optical light rods into groups and connecting said groups directly to said detectors, each detector adapted to produce an electrical signal when light rods in the group connected thereto experience a predetermined change in the light intensity at the sense area when a character image is projected onto said sense plate.

4. The combination of claim 3 with each detector comprising a photocell for each light rod in the group connected thereto, and an AND gate circuit for the group of optical rods responsive to the electrical signals of the photocells thereof.

5. The combination of claim 3 having at least one of the detectors which includes an "inhibit circuit" coupled between one of the said photocells and said AND gate, such that said gate will produce an output when all of the said photocells except said one photocell experience said predetermined change in received light intensity.

6. The system described in claim 1 in which light channels are used for the conduction of light from the sensor area to the detector area, said light channels being constructed of solid and flexible material and having provision for the interconnection of said channels into groups so that the light from various sensor areas is directed together and channeled to the detector areas in order to perform pattern recognition.

7. A character sensing system comprising a character sense plate consisting of a plurality of optical light channels having first ends supported in spaced relation to each other to form the shape and configuration of the characters and patterns to be recognized at said sense plate, with each channel in a particular group having its first end positioned to experience a change in received light intensity when a predetermined character image is projected onto said sense plate, and with second ends segregated into discrete groups joining directly a plurality of light responsive detectors, with a detector for each group and character to be recognized, and means of coupling and interconnecting each group of channels to a different detector, each detector having the means for producing an electrical signal when each group connected thereto experiences a predetermined change in received light intensity.

8. A character sensing system comprising a character sense plate consisting of a plurality of fibrous optical rods having first ends supported in spaced relation to each other by a material which occupies the spaces between said rods such that these optical rods form the shape and configuration of the characters and patterns to be recognized at the sense plate, with each pattern having a group of optical rods which identify the character, means of directly connecting each group of optical light conducting rods to detecting surfaces such that a recognition of characters and character groups may be accomplished when the optical light rods in the activated group or groups connected thereto experience a predetermined change in intensity of light received at the sense area when a character image is projected onto said sense plate.

9. A character sensing system comprising a character sense plate consisting of a plurality of fibrous optical rods mounted in spaced relation to each other with corresponding ends disposed so as to define an image detection surface to receive projections of characters to be recognized; means for activating a selected group of optical rods as determined by the input image, in which the first ends of said rods are positioned to experience a change in received light intensity when their coordinates are intercepted by the projected image; means for coupling and interconnecting the signal ends of said optical rods directly to a plurality of light responsive detectors, with each detector having means for producing an electrical signal when the optical light rods connected thereto experience a predetermined change in received light intensity.

10. A character recognition system comprising a sense plate having a plurality of fibrous optical rods mounted in spaced relation to each other with corresponding ends disposed so as to define an image detection surface to receive projections of characters to be recognized, means for illuminating said sense plate, means for transporting characters over said sense plate such that the images thereof will shade selected rods from the light emanating from said illuminating means, thus permitting a scanning, sampling and inspection of the transported surface and text, means connecting said rods directly to photosensitive detectors such that electrical signals result in response to changes in the intensity of light applied thereto by said rods, and means responsive to the signals of said detectors for providing a recognition output indicative of each character whose image produces an electrical signal from said detectors.

11. A character recognition system as defined by claim 10 wherein said optical light rods constitute a linear array which is arranged to provide a sense reference along only one axis, means of transporting characters in relation to said sense plate so that a direct linear sweep may be achieved wherein a plurality of light rods, each connected directly to a separate detector, provide a simultaneous sensing of a character segment and produce electrical signals indicative of the particular pattern segment to be recognized.

12. A character recognition system as defined in claim 10 wherein said detectors are controlled by timing signals and further wherein the method employed includes a plurality of comparators, means for coupling the signals of each detector to one of the said comparators, a memory unit having symbols representative of different character segments stored according to predetermined successive sampling time periods, means for activating the signals from said memory units to said comparators for the purpose of comparing the stored symbols, means for pulsing said detectors to sample changes in light intensity applied thereto by said rods at successive sampling times corresponding to and within said successive sampling time periods, and means responsive to said comparators for producing a signal indicative of each specific character whose image produces the desired signals from said detectors.

13. A character sensing system as defined by claim 10 wherein each rod is coupled to a separate photosensitive detector, and further including means for scanning said detectors electronically in groups according to a predetermined sequence.

14. A character recognition system comprising a sense plate having a plurality of fibrous optical rods mounted in spaced relation to each other so as to define a surface for receiving images of characters to be recognized, means coupling each rod to a separate photosensitive detector which produces an electrical signal in response to a change in the intensity of light received at said surface, means for scanning said detectors in groups according to a predetermined sequence, storage means containing groups of signals for each character to be recognized, the signals in each group representing successive increments of a particular character and corresponding to those obtained by sequential scanning of said detectors according to said predetermined sequence when said particular character is received by said surface, means for comparing the electrical signals of said detectors when scanned according to said predetermined sequence with each group of signals stored in said storage means, and means responsive to said comparing means for producing a signal indicative of a character which corresponds to the character whose signal determinants are stored in said storage section, and is determined to be the same as the electrical signals obtained by scanning said detectors.

15. A character recognition system as defined by claim 14, wherein said means for scanning said detectors comprises a plurality of preamplifiers arranged in groups corresponding to said groups of detectors, each preamplifier connected to receive the electrical signal of a different detector, and means for activating said groups of preamplifiers in said predetermined sequence.

16. A character recognition system as defined in claim 10 comprising means for scanning a character image so that successive portions thereof are detected according to a predetermined sequence, means for generating time-based signals representative of said successive detected portions of a scanned character image, storage means providing a permanent log of character signals representative of successive portions of each character image to be recognized by the system, means for comparing the time-based signals derived from scanning successive portions of a character image with the log of character signals stored in said storage means and for providing an electrical signal representative of a particular character image when the time-based signals derived from scanning a character image match a set of character signals in said log, and means for applying said electrical signal to actuating circuits.

17. A character recognition system as defined by claim 16 wherein said scanning means comprises a sense plate having a plurality of fibrous optical rods mounted in spaced relation to each other so as to define an image-receiving surface, on which each character image is scanned, and further including means coupled to said optical rods for producing said time-based signals in response to the light transmitted by said rods.

18. A character recognition system as defined by claim 17 wherein said means coupled to said optical rods for producing time-based signals comprises photosensitive devices.

19. A character recognition system as defined by claim 17 wherein said rods constitute a linear array of optical light rods arranged to provide a sense matrix reference along only one axis, to permit a scanning in a direction perpendicular to the oriented group of optical fiber rods.

20. A character recognition system as defined by claim 19 wherein said means for producing said time-based signals comprises a photosensitive device coupled to each rod.

21. A character recognition system as defined by claim 17 wherein said rods are arranged in a matrix comprising a series of parallel rows.

22. A character recognition system as defined by claim 21 wherein said means for producing said time-based signals comprises a photosensitive device coupled to each optical rod.

23. A character recognition system as defined in claim 1 in which the optical fiber rods are arranged adjacent to the photosensitive detectors.

References Cited by the Examiner

UNITED STATES PATENTS

| | | | |
|---|---|---|---|
| 2,759,045 | 8/56 | Young | 340—146.3 X |
| 2,762,862 | 9/56 | Bliss | 340—146.3 X |
| 2,881,976 | 4/59 | Greanias | 340—347 X |
| 2,976,447 | 3/61 | McNaney | 313—108 X |
| 3,043,179 | 7/62 | Dunn | 88—1 |
| 3,102,995 | 9/63 | Abbott et al. | 340—146.3 |
| 3,109,065 | 10/63 | McNaney | 178—30 |
| 3,112,360 | 11/63 | Gregg | 340—146.3 X |
| 3,125,683 | 3/64 | Stewart et al. | 340—146.3 |

OTHER REFERENCES

Publication: IBM Technical Disclosure Bulletin "Optical Displacement Measuring Device," by J. J. Hamrick et al.; vol. 4, No. 7, page 85, 12/61.

MALCOLM A. MORRISON, *Primary Examiner.*